United States Patent
Schuck et al.

(10) Patent No.: US 9,927,691 B2
(45) Date of Patent: Mar. 27, 2018

(54) POLARIZATION CONVERSION SYSTEMS FOR STEREOSCOPIC PROJECTION

(71) Applicant: RealD Inc., Beverly Hills, CA (US)

(72) Inventors: Miller H. Schuck, Erie, CO (US); Michael G. Robinson, Boulder, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/621,836

(22) Filed: Feb. 13, 2015

(65) Prior Publication Data

US 2016/0041460 A1    Feb. 11, 2016

Related U.S. Application Data

(63) Continuation of application No. 13/550,182, filed on Jul. 16, 2012, now Pat. No. 8,833,943, which is a (Continued)

(51) Int. Cl.
*G02B 27/22* (2006.01)
*G03B 35/26* (2006.01)
(Continued)

(52) U.S. Cl.
CPC ......... *G03B 35/26* (2013.01); *G02B 27/2264* (2013.01); *G02B 27/26* (2013.01);
(Continued)

(58) Field of Classification Search
CPC ........ G03B 35/26; G03B 21/28; G03B 35/22; G02B 27/2264; G02B 27/283
See application file for complete search history.

(56) References Cited

U.S. PATENT DOCUMENTS 2,403,731 A    7/1946  macNeille
3,208,337 A    9/1965  Appledorn
(Continued)

FOREIGN PATENT DOCUMENTS

BR    2020130172753    4/2013
CN    101021674 A    8/2007
(Continued)

OTHER PUBLICATIONS

Notice of Reasons for Rejection in Japanese application No. 2009-530647, dated Jul. 2, 2013.
(Continued)

*Primary Examiner* — Tony Ko
(74) *Attorney, Agent, or Firm* — Penny L. Lowry; Neil G. Mothew (57) ABSTRACT

The PCS may include a polarizing beam splitter, a polarization rotating element, a reflecting element, and a polarization switch. Typically, a projector outputs randomly-polarized light. This light is input to the PCS, in which the PCS separates p-polarized light and s-polarized light at the polarizing beam splitter. P-polarized light is directed toward the polarization switch on a first path. The s-polarized light is passed on a second path through the polarization rotating element (e.g., a half-wave plate), thereby transforming it to p-polarized light. A reflecting element directs the transformed polarized light (now p-polarized) along the second path toward the polarization switch. The first and second light paths are ultimately directed toward a projection screen to collectively form a brighter screen image in cinematic applications utilizing polarized light for three-dimensional viewing.

9 Claims, 6 Drawing Sheets

Related U.S. Application Data continuation of application No. 13/047,763, filed on Mar. 14, 2011, now Pat. No. 8,220,934, which is a continuation of application No. 11/864,198, filed on Sep. 28, 2007, now Pat. No. 7,905,602, application No. 14/621,836, which is a continuation of application No. 14/485,256, filed on Sep. 12, 2014, now Pat. No. 9,594,298.

(60) Provisional application No. 60/950,652, filed on Jul. 19, 2007, provisional application No. 60/911,043, filed on Apr. 10, 2007, provisional application No. 60/827,657, filed on Sep. 29, 2006.

(51) Int. Cl.

| | | |
|---|---|---|
| G02B 27/26 | (2006.01) | |
| G02B 27/28 | (2006.01) | |
| H04N 13/04 | (2006.01) | |
| G03B 21/14 | (2006.01) | |
| G03B 21/28 | (2006.01) | |
| G03B 35/22 | (2006.01) | |

(52) U.S. Cl.
CPC ......... *G02B 27/283* (2013.01); *G03B 21/142* (2013.01); *G03B 21/28* (2013.01); *G03B 35/22* (2013.01); *H04N 13/0438* (2013.01)

(56) References Cited

U.S. PATENT DOCUMENTS

| | | |
|---|---|---|
| 3,704,997 A | 12/1972 | Smith |
| 4,515,441 A | 5/1985 | Wentz et al. |
| 4,719,507 A | 1/1988 | Bos |
| 4,792,850 A | 12/1988 | Liptoh |
| 5,164,854 A | 11/1992 | Takanashi |
| 5,225,861 A | 7/1993 | Marks |
| 5,278,680 A | 1/1994 | Karasawa |
| 5,283,600 A | 2/1994 | Isai |
| 5,359,455 A | 10/1994 | Oishi |
| 5,381,278 A | 1/1995 | Shingaki et al. |
| 5,435,859 A | 7/1995 | Torii |
| 5,453,859 A | 9/1995 | Sannohe et al. |
| 5,481,321 A | 1/1996 | Lipton |
| 5,497,270 A | 3/1996 | Rud |
| 5,566,367 A | 10/1996 | Mitsutake |
| 5,691,785 A | 11/1997 | Usui |
| 5,729,306 A | 3/1998 | Miyake et al. |
| 5,772,299 A | 6/1998 | Koo et al. |
| 5,822,128 A | 10/1998 | Sekine |
| 5,822,129 A | 10/1998 | Sekine |
| 5,917,562 A | 6/1999 | Woodgate et al. |
| 5,917,568 A | 6/1999 | Johnson |
| 5,982,538 A | 11/1999 | Shikama et al. |
| 5,993,004 A | 11/1999 | Moseley |
| 6,067,193 A | 5/2000 | Sekine |
| 6,094,240 A | 7/2000 | Hiyama et al. |
| 6,122,103 A | 9/2000 | Perkins et al. |
| 6,147,802 A | 11/2000 | Itoh et al. |
| 6,154,320 A | 11/2000 | Itoh |
| 6,190,013 B1 | 2/2001 | Tani et al. |
| 6,206,532 B1 | 3/2001 | Hawes |
| 6,243,199 B1 | 6/2001 | Hansen et al. |
| 6,252,624 B1 | 6/2001 | Yuasa |
| 6,280,034 B1 | 8/2001 | Brennesholtz |
| 6,288,840 B1 | 9/2001 | Perkins |
| 6,375,327 B2 | 4/2002 | Holman |
| 6,437,915 B2 | 8/2002 | Moseley et al. |
| 6,454,416 B2 | 9/2002 | Aoto |
| 6,508,557 B1 | 1/2003 | Brennesholtz |
| 6,547,396 B1 | 4/2003 | Svardal |
| 6,582,080 B2 | 6/2003 | Gibbon et al. |
| 6,631,992 B2 | 10/2003 | Brennesholtz |
| 6,636,276 B1 | 10/2003 | Rosenbluth |
| 6,704,065 B1 | 3/2004 | Sharp et al. |
| 6,761,459 B1 | 7/2004 | Arsenich |
| 6,801,263 B2 | 10/2004 | Sato et al. |
| 6,839,095 B2 | 1/2005 | Bierhuizen et al. |
| 6,912,074 B1 | 6/2005 | Son et al. |
| 6,976,759 B2 * | 12/2005 | Magarill ............ G02B 5/3033 353/20 |
| 7,008,070 B2 | 3/2006 | Nishida |
| 7,131,737 B2 | 11/2006 | Silverstein et al. |
| 7,193,765 B2 | 3/2007 | Christensen |
| 7,198,373 B2 | 4/2007 | Silverstein |
| 7,204,592 B2 | 4/2007 | O'Donnell |
| 7,224,411 B2 | 5/2007 | Gibbon et al. |
| 7,261,453 B2 | 8/2007 | Morejon |
| 7,270,416 B2 | 9/2007 | Yamanaka |
| 7,295,371 B1 | 11/2007 | Sedlmayr |
| 7,364,303 B2 | 4/2008 | Inoko |
| 7,387,388 B2 | 6/2008 | Newell |
| 7,528,906 B2 | 5/2009 | Robinson et al. |
| 7,559,653 B2 | 7/2009 | Silverstein et al. |
| 7,635,187 B2 | 12/2009 | Sonehara |
| 7,753,531 B2 | 7/2010 | Fujita |
| 7,857,455 B2 | 12/2010 | Cowan et al. |
| 7,887,193 B2 | 2/2011 | Kanayama |
| 7,905,602 B2 | 3/2011 | Schuck et al. |
| 7,959,296 B2 | 6/2011 | Cowan et al. |
| 8,134,109 B2 | 3/2012 | Tang |
| 8,220,934 B2 | 7/2012 | Schuck et al. |
| 8,632,185 B2 | 1/2014 | Ianchulev |
| 8,727,536 B2 | 5/2014 | Schuck |
| 8,833,943 B2 | 9/2014 | Schuck |
| 2001/0013971 A1 | 8/2001 | Kleinberger |
| 2003/0128320 A1 | 7/2003 | Mi et al. |
| 2004/0090601 A1 | 5/2004 | Nakanishi |
| 2004/0246586 A1 | 12/2004 | Cho |
| 2004/0263806 A1 | 12/2004 | Silverstein |
| 2005/0017938 A1 | 1/2005 | O'Donnell |
| 2005/0030749 A1 | 2/2005 | Nishida |
| 2005/0185139 A1 | 8/2005 | Yamanaka |
| 2006/0007537 A1 | 1/2006 | Sedlmayr |
| 2006/0044516 A1 | 3/2006 | Inoko |
| 2006/0092380 A1 | 5/2006 | Salsman |
| 2006/0215118 A1 | 9/2006 | Sonehara |
| 2006/0221429 A1 | 10/2006 | Christensen |
| 2006/0250581 A1 * | 11/2006 | Silverstein .......... H04N 9/3105 353/20 |
| 2006/0291053 A1 | 12/2006 | Robinson et al. |
| 2007/0279595 A1 | 12/2007 | Magarill |
| 2008/0143964 A1 * | 6/2008 | Cowan ................ G03B 35/18 353/7 |
| 2008/0143965 A1 | 6/2008 | Cowan |
| 2008/0225236 A1 | 9/2008 | Schuck et al. |
| 2009/0128780 A1 | 5/2009 | Schuck |
| 2010/0141856 A1 | 6/2010 | Schuck et al. |
| 2010/0328561 A1 | 12/2010 | Schuck |
| 2011/0096295 A1 | 4/2011 | Cowan |
| 2011/0205496 A1 | 8/2011 | Schuck |
| 2012/0057134 A1 | 3/2012 | Huang |
| 2013/0088688 A1 | 4/2013 | Read et al. |
| 2013/0169935 A1 | 7/2013 | Schuck |
| 2015/0002819 A1 | 1/2015 | Schuck |
| 2015/0109539 A1 | 4/2015 | Li et al. |
| 2016/0041460 A1 | 2/2016 | Schuck |

FOREIGN PATENT DOCUMENTS

| | | |
|---|---|---|
| CN | 101408675 A | 4/2009 |
| CN | 101688940 | 3/2010 |
| CN | 103383494 | 11/2013 |
| CN | 203433207 A | 2/2014 |
| CN | 103827745 | 5/2014 |
| DE | 20023883 U1 | 3/2007 |
| DE | 102008043153 A1 | 4/2010 |
| EP | 349692 A2 | 10/1990 |
| EP | 1961237 | 6/2007 |
| EP | 2074479 | 4/2008 |
| EP | 2145215 | 11/2008 |
| EP | 2067066 | 6/2009 |
| EP | 2469336 | 6/2012 |

(56) References Cited

FOREIGN PATENT DOCUMENTS

| | | |
|---|---|---|
| EP | 2732335 | 5/2014 |
| EP | 2851735 | 3/2015 |
| GB | 672012 B | 5/1952 |
| JP | S62-011823 | 1/1987 |
| JP | H04-63305 A | 2/1992 |
| JP | H05-073116 | 3/1993 |
| JP | H05-127120 | 5/1993 |
| JP | H05-203894 A | 8/1993 |
| JP | H05-241103 A | 9/1993 |
| JP | H06-289387 | 10/1994 |
| JP | H06-317760 A | 11/1994 |
| JP | H07-056167 | 3/1995 |
| JP | H07-064075 | 3/1995 |
| JP | H07-072428 B1 | 3/1995 |
| JP | H07-146474 A | 6/1995 |
| JP | H07-239473 A | 9/1995 |
| JP | 07-333557 | 12/1995 |
| JP | H07-333557 B1 | 12/1995 |
| JP | 2538127 B2 | 9/1996 |
| JP | H08-317428 | 11/1996 |
| JP | H09-026555 | 1/1997 |
| JP | H09-120047 A | 5/1997 |
| JP | H11-260141 B1 | 9/1999 |
| JP | 2002-287092 | 10/2002 |
| JP | 2004-138433 A | 5/2004 |
| JP | 2005-512118 | 4/2005 |
| JP | 2005-241870 | 9/2005 |
| JP | 2006-133601 | 5/2006 |
| JP | 2006-227361 | 8/2006 |
| JP | 2010-506199 | 2/2010 |
| JP | 2010-507130 | 3/2010 |
| JP | 2010-072138 A | 4/2010 |
| JP | 2010-122589 A | 6/2010 |
| JP | 2010-164802 A | 7/2010 |
| JP | 2010-528323 | 8/2010 |
| JP | 2010-276710 A | 12/2010 |
| JP | 2013-003327 A | 1/2013 |
| JP | 2013-020199 A | 1/2013 |
| JP | 2014-052930 A | 3/2014 |
| JP | 5635773 B2 | 12/2014 |
| JP | 5641424 B2 | 12/2014 |
| JP | 2015-072479 | 4/2015 |
| JP | 5878967 | 3/2016 |
| KR | 10-2009-0089325 A | 8/2009 |
| KR | 2009008932 | 8/2009 |
| KR | 10-2012-0091414 A | 9/2009 |
| KR | 20090094224 | 9/2009 |
| KR | 20100023858 A | 3/2010 |
| KR | 10-2013-129256 A | 11/2013 |
| KR | 20140054072 A | 5/2014 |
| KR | 20140102775 | 8/2014 |
| KR | 20150072457 | 6/2015 |
| KR | 20150104222 | 9/2015 |
| KR | 101594630 B1 | 2/2016 |
| SU | 1182471 B | 9/1985 |
| WO | 2000/078056 | 12/2000 |
| WO | 2005-069058 | 7/2005 |
| WO | 2005-069058 A1 | 7/2005 |
| WO | 2006038744 | 4/2006 |
| WO | 2007-070245 | 6/2007 |
| WO | 2007-070245 A1 | 6/2007 |
| WO | 2008-048494 A1 | 4/2008 |
| WO | 2008042798 | 4/2008 |
| WO | 2008-141247 A1 | 11/2008 |
| WO | 2013001016 | 1/2013 |
| WO | 2014-163322 A1 | 10/2014 |

OTHER PUBLICATIONS

International Preliminary Report on Patentability for PCT/US 07/79958, mailed Apr. 9, 2008.
International Preliminary Examination Report for PCT/US 07121823, mailed May 14, 2009.
International Search Report and Written Opinion for PCT/US 07/21823, mailed Apr. 2, 2008.
Extended European search report for European application 078843526, mailed Nov. 3, 2011.
USPTO Inter Partes Review of U.S. Pat. No. 7,857,455, IPR2015-00033 (not instituted).
USPTO Inter Partes Review of U.S. Pat. No. 7,857,455, IPR2015-00035 (instituted in part & currently pending).
USPTO Inter Partes Review of U.S. Pat. No. 7,959,296, IPR2015-00036 (not instituted).
USPTO Inter Partes Review of U.S. Pat. No. 7,905,602, IPR2015-00038 (not instituted).
USPTO Inter Partes Review of U.S. Pat. No. 8,220,934, IPR2015-00040 (instituted in part & currently pending).
USPTO Inter Partes Review of U.S. Pat. No. 7,857,455, IPR2015-00876 (awaiting institution decision).
USPTO Inter Partes Review of U.S. Pat. No. 8,220,934, IPR2015-00877 (awaiting institution decision).
Respondents' Notice of Prior Art (4)_Redacted, Apr. 24, 2015.
Foster; "A Polarizing Vertical Illuminator"; Journal Optical Soc. New York, vol. 28, (1938), pp. 124-127.
King et al.; "Varifocal Mirror Technique for Video Transmission of Three-Dimensional Images"; Applied Optics, vol. 9, No. 9, (1970).
Pate; "Polarization Conversion Systems for Digital Projectors", Published Apr. 21, 2006.
Robinson et al., "Polarization Engineering for LCD Projection", John Wiley & Sons, (2005).
Shao et al., "MEMS Three-Dimensional Scan Mirror", Dept. of Elec. and Computer Engr., Montana State Univ.-Bozeman, (2004).
Shurcliff, "Polarized Light"; Harvard University Press, (1962).
Stupp et al, "Projection Displays", John Wiley & Sons Ltd., (1999), pp. 143-145.
Yang et al., "Fundamentals of Liquid Crystal Devices"; John Wiley & Sons Ltd., (2006).
Yip et al., "Efficient polarization converter for projection displays", Applied Optics, vol. 36, No. 25, (1997).
Yoder, "Opto-mechanical Systems Design", Optical Engineering, vol. 9, Marcel Dekker Inc. (1986).
Jones, R. Clark. "Ultimate Performance of Polarizers for Visible Light," JOSA vol. 52 No. 7, Jul. 1962.
Pan, Jui-Wen, et al., "Homogenized LED-illumination using microlens arrays for a pocket-sized projector," Optics Express, Aug. 20, 2007, vol. 15, No. 17.
Muirhead; "Variable Focal Length Mirrors"; Phys. and Meteorology Section, Suffield Experimental Station, Ralston, Alberta, Canada; Rev_Sci. Instrum_vol. 32, No. 210 (1961).
Kingslake, R.; "Optical System Design"; Academic Press; (1983).
International Preliminary Report on Patentability for PCT/US 07/79958, mailed Apr. 9, 2009.
International Search Report and Written Opinion for PCT/US 07/79958, mailed Jul. 28, 2008.
Examination Report and Supplemental European Search Report for European application 07852705.8, dated Sep. 4, 2009.
Examination Report for European application 07843526.0, dated Jul. 17, 2012.
Supplemental European Search Report and Examination Report in European application No. 07843526.0 mailed Oct. 4, 2011.
Notice of Reasons for Rejection in Japanese application No. 2009-530647, dated Dec. 4, 2013.
Notification concerning transmittal of international preliminary report on patentability and international preliminary report on patentability in corresponding PCT application No. PCT/US08/63340 dated Nov. 10, 2009.
Pastoor et al., "3-D Displays: A Review of Current Technologies", Display Devices, Dempa Publications, Tokyo, JP, vol. 17, No. 2, pp. 100-110 (1997).
Petition for Inter Partes Review of U.S. Pat. No. 7,857,455 entered Oct. 7, 2014. *Master Image 3D, Inc. and Master Image 3D Asia, LLC,* v. *Reald Inc.* Case No. IPR2015-00035, U.S. Pat. No. 7,857,455 filed Oct. 7, 2014.

(56) References Cited

OTHER PUBLICATIONS

Exhibit 1003 "Declaration of Matthew S. Brennescholtz" entered Oct. 7, 2014. *Master Image 3D, Inc. and Master Image 3D Asia, LLC,* v. *Reald Inc.* Case No. IPR2015-00035, U.S. Pat. No. 7,857,455 filed Oct. 7, 2014.

Preliminary Response to Petition for Inter Partes Review of U.S. Pat. No. 7,857,455 entered Feb. 2, 2015. *Master Image 3D, Inc. and Master Image 3D Asia, LLC,* v. *Reald Inc.* Case No. IPR2015-00035, U.S. Pat. No. 7,857,455 filed Oct. 7, 2014.

Decision—Institution of Inter Partes Review of U.S. Pat. No. 7,857,455, entered Apr. 23, 2015. *Master Image 3D, Inc. and Master Image 3D Asia, LLC,* v. *Reald Inc.* Case No. IPR2015-00035, U.S. Pat. No. 7,857,455 filed October 7, 2014.

Patent Owner's Response Regarding Inter Partes Review of U.S. Pat. No. 7,857,455, entered Jul. 14, 2015. *Master Image 3D, Inc. and Master Image 3D Asia, LLC,* v. *Reald Inc.* Case No. IPR2015-00035, U.S. Pat. No. 7,857,455 filed Oct. 7, 2014.

Exhibit 2005, "Declaration of Ying-Moh Liu," Patent Owner's Response Regarding Inter Partes Review, entered Jul. 14, 2015. *Master Image 3D, Inc. and Master Image 3D Asia, LLC,* v. *Reald Inc.* Case No. IPR2015-00035, U.S. Pat. No. 7,857,455 filed Oct. 7, 2014.

Exhibit 2006, "Declaration of Matt Cowan," Patent Owner's Response Regarding Inter Partes Review of U.S. Pat. No. 7,857,455, entered Jul. 14, 2015. *Master Image 3D, Inc. and Master Image 3D Asia, LLC,* v. *Reald Inc.* Case No. IPR2015-00035, U.S. Pat. No. 7,857,455 filed Oct. 7, 2014.

Exhibit 2008, "Declaration of Robert R. McLeod," Patent Owner's Response Regarding Inter Partes Review of U.S. Pat. No. 7,857,455, entered Jul. 14, 2015. *Master Image 3D, Inc. and Master Image 3D Asia, LLC,* v. *Reald Inc.* Case No. IPR2015-00035, U.S. Pat. No. 7,857,455 filed Oct. 7, 2014.

Petitioner Response to Motion for Observation on Cross Examination of Matthew Brennescholtz, entered Nov. 25, 2015. *Master Image 3D, Inc. and Master Image 3D Asia, LLC,* v. *Reald Inc.* Case No. IPR2015-00035, Patent No. 7,857,455 filed Oct. 7, 2014.

Exhibit 2190, "Public Transcript of M. Brennescholtz" entered Nov. 11, 2015. *Master Image 3D, Inc. and Master Image 3D Asia, LLC,* v. *Reald Inc.* Case No. IPR2015-00035, U.S. Pat. No. 7,857,455 filed Oct. 7, 2014.

Petition for Inter Partes Review of U.S. Pat. No. 7,959,296 entered Oct. 7, 2014. *Master Image 3D, Inc. and Master Image 3D Asia, LLC,* v. *Reald Inc.,* Case No. IPR2015-00036, U.S. Pat. No. 7,959,296 filed Oct. 7, 2014.

Preliminary Response to Petition for Inter Partes Review of U.S. Pat. No. 7,959,296 entered Jan. 29, 2015. *Master Image 3D, Inc. and Master Image 3D Asia, LLC,* v. *Reald Inc.,* Case No. IPR2015-00036, U.S. Pat. No. 7,959,296 filed Oct. 7, 2014.

Decision—Denying Institution of Inter Partes Review, entered Apr. 22, 2015. *Master Image 3D, Inc. and Master Image 3D Asia, LLC,* v. *Reald Inc.,* Case No. IPR2015-00036, U.S. Pat. No. 7,959,296 filed Oct. 7, 2014.

PTAB Final Written Decision, entered Apr. 14, 2016. *Masterimage 3D, Inc and Masterimage 3D Asia, LLC* v. *Reald Inc.* Case No. IPR2015-00040, U.S. Pat. No. 8,220,934 filed Oct. 7, 2014.

Notice of Preliminary Rejection in co-pending Korean patent application No. 10-2016-7013674, dated Aug. 17, 2016.

Notice of Preliminary Rejection in co-pending Korean patent application No. 10-2016-7021821, dated May 19, 2016.

* cited by examiner

POLARIZATION CONVERSION SYSTEMS FOR STEREOSCOPIC PROJECTION

CROSS-REFERENCE TO RELATED APPLICATIONS

This patent application is a continuation application of and claims priority to U.S. patent application Ser. No. 14/485,256, entitled "Polarization conversion systems for stereoscopic projection", filed Sep. 12, 2014, which is a continuation application of U.S. patent application Ser. No. 13/550,182, now U.S. Pat. No. 8,833,943, entitled "Polarization conversion systems for stereoscopic projection", filed Jul. 16, 2012, which is a continuation application of U.S. patent application Ser. No. 13/047,763, now U.S. Pat. No. 8,220,934, entitled "Polarization conversion system for stereoscopic projection", filed Mar. 14, 2011, which is a continuation application of U.S. patent application Ser. No. 11/864,198, now U.S. Pat. No. 7,905,602, entitled "Polarization conversion system for stereoscopic projection", filed Sep. 28, 2007, which relates and claims priority from: (a) U.S. provisional patent application number 60/827,657, entitled "Polarization Conversion System for Cinematic Projection," filed Sep. 29, 2006; (b) U.S. provisional patent application number 60/911,043, entitled "Polarization conversion system for 3-D projection," filed Apr. 10, 2007; and (c) U.S. provisional patent application No. 60/950,652, entitled "Polarization conversion system for 3-D projection," filed Jul. 19, 2007. All applications referenced above are herein incorporated by reference in their entirety.

TECHNICAL FIELD

This disclosure relates to a projection system for projecting images for a three-dimensional viewing experience, and more in particular to a polarization conversion system utilizing polarized light for encoding stereoscopic images.

BACKGROUND

Three-dimensional (3D) imagery can be synthesized using polarization control following the projector and polarization controlling eyewear (see, e.g., U.S. Pat. No. 4,792,850 to Lipton, which is hereby incorporated by reference herein).

Figure 1:
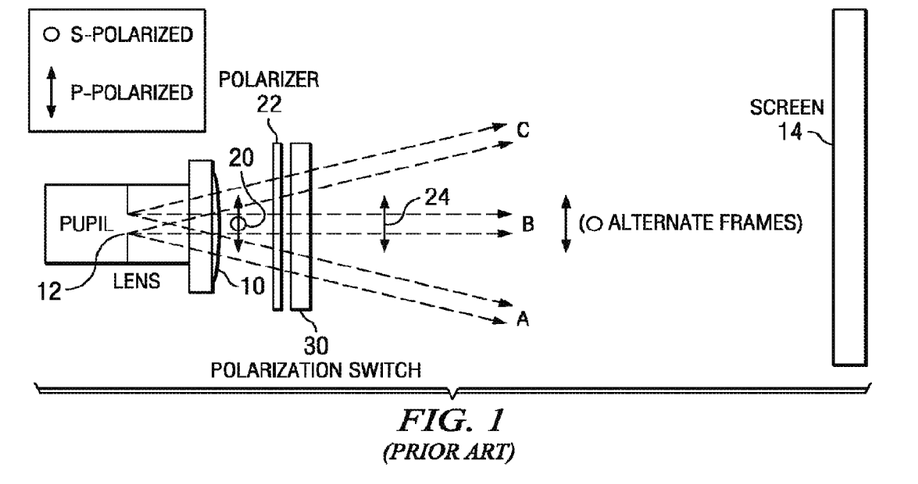
FIG. 1 is a schematic diagram of a conventional polarization switch for stereoscopic projection.

A conventional implementation of polarization control at the projector is shown in FIG. 1. In this implementation, nearly parallel rays emerge from the output of the lens 10, appearing to originate from a pupil 12 inside of the lens 10, and converge to form spots on a screen 14. Ray bundles A, B, and C in FIG. 1 are bundles forming spots at the bottom, center, and top of a screen 14, respectively. The light 20 emerging from the projection lens is randomly polarized, depicted in FIG. 1 as both s- and p-polarized light [s-polarized light is conventionally represented as 'o'; p-polarized light is represented with a double arrow-ended line]. The light 20 passes through a linear polarizer 22, resulting in a single polarization state after the polarizer 22. The orthogonal polarization state is absorbed (or reflected), and the light flux after the polarizer 22 is typically less than half of the original flux, thus resulting in a dimmer final image. The polarization switch 30 is synchronized with the image frame, and the polarization state 24 emerging from the polarization switch is alternated, producing images of alternately orthogonal polarization at the screen. Polarization-selective eyewear allows images of one polarization to pass to the left eye, and images of the orthogonal polarization to pass to the right eye. By presenting different images to each eye, 3D imagery can be synthesized.

This conventional system has been used in theatres. However, the conventional system requires that greater than 50% of the light is absorbed by the polarizer, and the resulting image is greater than 50% dimmer than that of a typical 2D theatre. The dimmer image can limit the size of theatre used for 3D applications and/or provides a less desirable viewing experience for the audience.

SUMMARY

Addressing the aforementioned problems, various embodiments of polarization conversion systems that receive light from a projector are described. The polarization conversion systems present a brighter screen image in cinematic applications utilizing polarized light for three-dimensional viewing.

In an embodiment, a polarization conversion system includes a polarization beam splitter (PBS), a polarization rotator, and a polarization switch. The PBS is operable to receive randomly-polarized light bundles from a projector lens, and direct first light bundles having a first state of polarization (SOP) along a first light path. The PBS is also operable to direct second light bundles having a second SOP along a second light path. The polarization rotator is located on the second light path, and is operable to translate the second SOP to the first SOP. The polarization switch is operable to receive first and second light bundles from the first and second light paths respectively, and to selectively translate the polarization states of the first and second light bundles to one of a first output SOP and a second output SOP. First light bundles are transmitted toward a projection screen. A reflecting element may be located in the second light path to direct second light bundles toward a projection screen such that the first and second light bundles substantially overlap to form a brighter screen image.

In accordance with another aspect of the disclosure, a method for stereoscopic image projection includes receiving randomly-polarized light from a projector, directing first state of polarization (SOP) light on a first light path, and directing second SOP light on a second light path. The method also includes transforming the second SOP light on the second light path to first SOP light, and selectively translating the first SOP light on both light paths to one of a first output SOP and a second output SOP.

Other aspects and embodiments are described below in the detailed description.

DESCRIPTION

Various embodiments of polarization conversion systems that receive light from a projector are described. The polarization conversion systems present a brighter screen image in cinematic applications utilizing polarized light for three-dimensional viewing.

Figure 2:
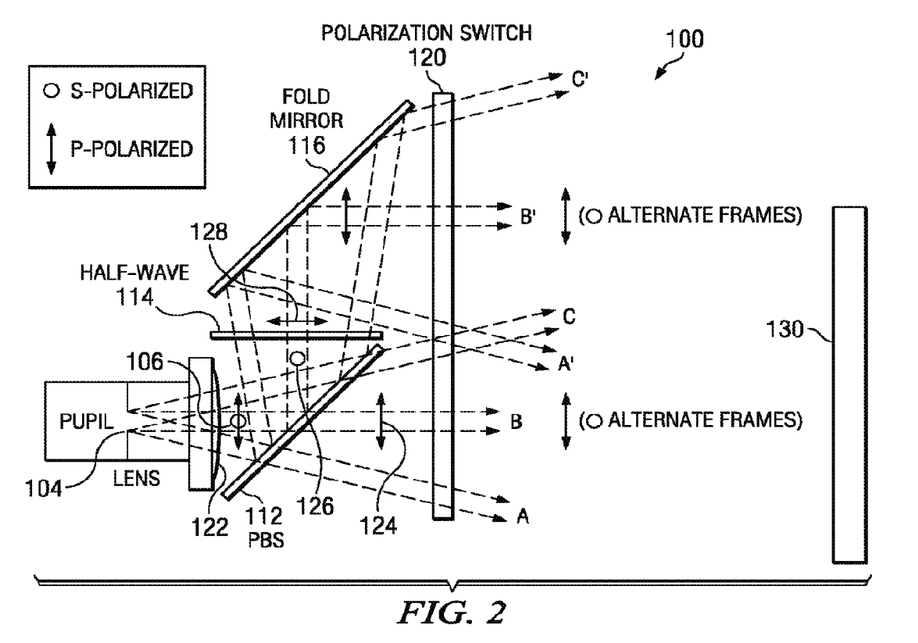
FIG. 2 is a schematic diagram of a polarization conversion system (PCS) for cinematic projection in accordance with the present disclosure.

FIG. 2 is a schematic diagram showing a polarization conversion system (PCS) 100 for cinematic projection. An embodiment of the polarization conversion system 100 includes a polarizing beam splitter (PBS) 112, a polarization rotator 114 (e.g., a half-wave plate), a reflecting element 116 (e.g., a fold mirror), and a polarization switch 120, arranged as shown. The polarization conversion system 100 may receive images from a conventional projector with a projection lens 122.

In operation, ray bundles A, B, and C emerge randomly polarized from the lens 122 and are projected toward a screen 130 to form an image. In this embodiment, a PBS 112 is inserted in place of the polarizer 22 shown in FIG. 1. The PBS 112 transmits P-polarized light 124, and reflects S-polarized light 126. The P-polarized light 124 passes through the polarization switch (bundles A, B, and C) and is rotated by the polarization switch in alternating frames, same as bundles A, B, and C in FIG. 1.

The S-polarized light 126 reflected by the PBS 112 passes through a polarization rotator 114 (e.g., a half-wave plate, preferably achromatic in some embodiments) and is rotated to p-polarized light 128. The new p-polarized light 128 passes to a fold mirror 116. The fold mirror 116 reflects the new p-polarized light 128 and passes it to polarization switch 120. The polarization switch 120, acting on p-polarized ray bundles A', B', and C', rotates the polarization of the ray bundles in alternating frames, in synchronization with the rotation of bundles A, B, and C. The position of bundles A', B', and C' at the screen may be adjusted (e.g., by adjusting the tilt of the fold mirror 116) to closely or exactly coincide with the positions of bundles A, B, and C at the screen. Since nearly all of the randomly polarized light 106 from the projection lens 122 is imaged at the screen 130 with a single polarization state, the resulting image of the system in FIG. 2 is approximately two times brighter than the image at the screen for the system in FIG. 1.

In this exemplary embodiment, the PBS 112 in FIG. 2 is depicted as a plate. However, various types of PBSs may be used. For example, the PBS plate may be constructed using a wire grid polarizer on glass (e.g., Proflux polarizer from Moxtek in Orem, Utah), polarization recycling film (e.g., Double Brightness Enhancing Film from 3M in St. Paul, Minn.), polarization recycling film on glass (for flatness), or a multi-dielectric layer on glass. The PBS 112 in FIG. 2 could alternatively be implemented as a glass cube (with wire grid, polarization recycling film, or dielectric layers along the diagonal) to reduce astigmatism in the final image associated with light passing through a tilted plate. Alternatively, the tilted plate PBS 112 in FIG. 2 may, in various embodiments, be implemented with spherical, aspheric, cylindrical or toroidal surfaces to reduce astigmatism in the final image at the screen 130. De-centered spherical, aspheric, cylindrical or toroidal surfaces on the plate, and/or additional de-centered spherical, aspheric, cylindrical or toroidal elements in the optical path after the plate can be implemented to reduce astigmatism in the final image. See, e.g., "Simple method of correcting the aberrations of a beamsplitter in converging light," V. Doherty and D. Shafer, Proc. SPIE, Vol. 0237, pp. 195-200, 1980, which is hereby incorporated by reference. It should also be noted that a second flat plate may be inserted into the system after the tilted PBS plate 112 and its tilt adjusted to reduce or correct astigmatism in the final image.

In some embodiments, the polarization rotator 114 in FIG. 2 may be an achromatic half-wave plate. The half-wave plate may be implemented with polymer films (e.g., Achromatic Retardation Plate from ColorLink, Inc., Boulder, Colo.), quartz plates, or a static liquid crystal device optionally patterned to account for geometric polarization alteration. The half-wave plate 114 may be positioned as shown in FIG. 2, or in other embodiments, it may be positioned between the fold mirror 116 and polarization switch 120, intersecting ray bundles A', B', and C'. This implementation may be desirable, as bundles A', B', and C' reflect from the fold mirror 116 in s-polarization state and mirrors often have a higher reflection for s-polarized light. However, with such an implementation, the half-wave plate 114 should be located such that bundles A' and C do not overlap at the plate. Although in most described embodiments herein, the polarization rotator 114 is located in the second light path, it may alternatively be placed in the first light path instead, and the polarization conversion system will operate in a similar manner in accordance with the principles of the present disclosure.

In some embodiments, the fold mirror 116 may be replaced with a PBS element (e.g., wire grid plate). In this case, a purer polarization may be maintained after the PBS element.

Polarization switch 120 may be a switch as taught by U.S. Pat. No. 4,792,850; a switch as taught by any of the switches of commonly-assigned U.S. patent application Ser. No. 11/424,087 entitled "Achromatic Polarization Switches", filed Jun. 14, 2006; both of which are incorporated by reference in their entirety for all purposes, or any other polarization switch known in the art that selectively transforms an incoming state of polarization. In some embodiments, the polarization switch 120 can be split (i.e., to increase yield of the device). If the polarization switch 120 is split, it is desirable that the two devices are located such that there is no overlap of bundles A' and C in FIG. 2. Splitting the polarization switch 120 allows one portion to be relocated in the A', B', C' optical path between the half-wave plate 114 and fold mirror 116. Placing the polarization switch 120 here may call for the fold mirror 116 to have better polarization preserving properties (e.g., a Silflex coating from Oerlikon in Golden, Colo.) as this may be the last element in the A', B', C' optical path prior to the screen.

Figure 3:
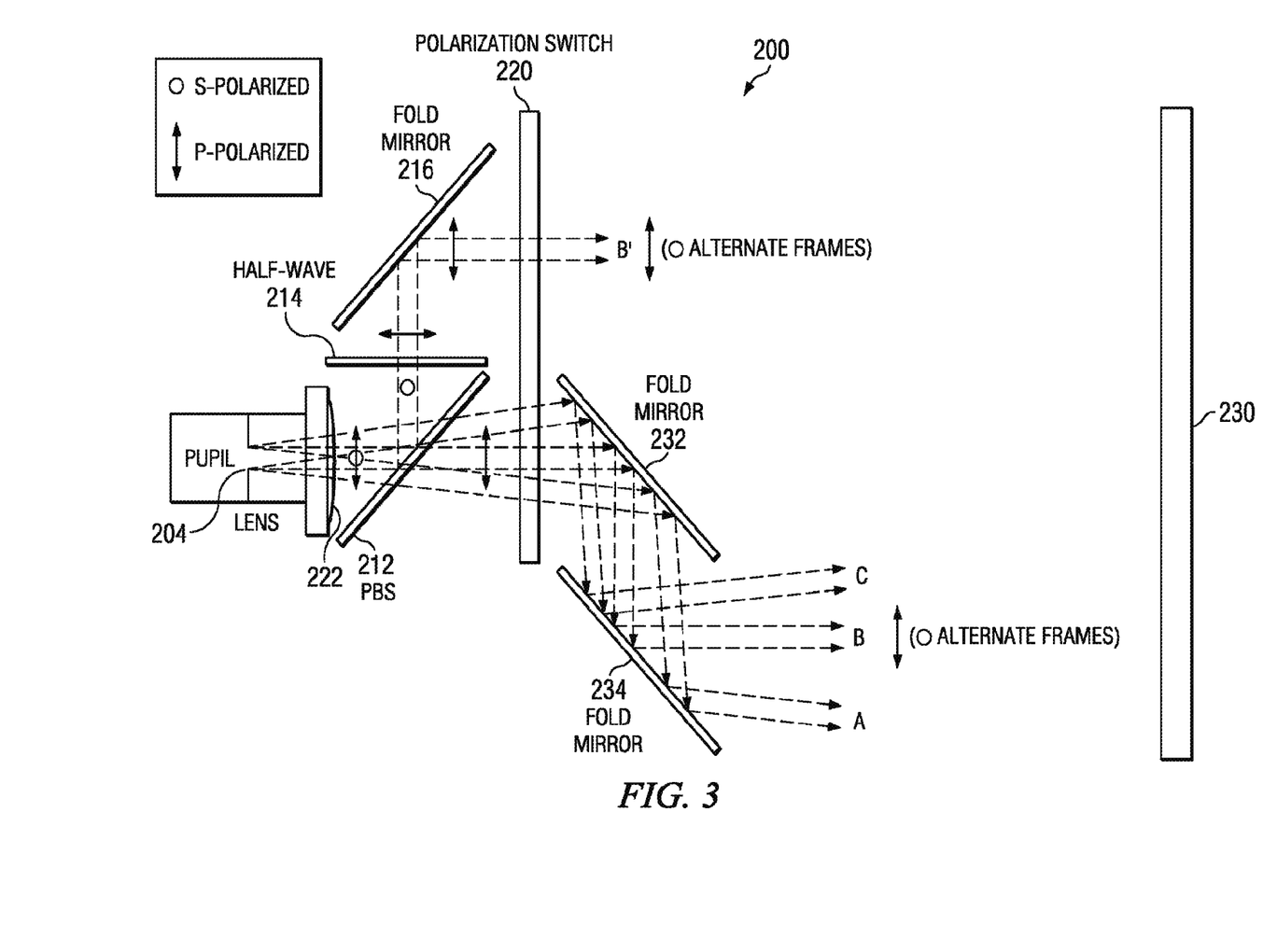
FIG. 3 is a schematic diagram of another embodiment of a PCS for cinematic projection in accordance with the present disclosure.
Figure 4:
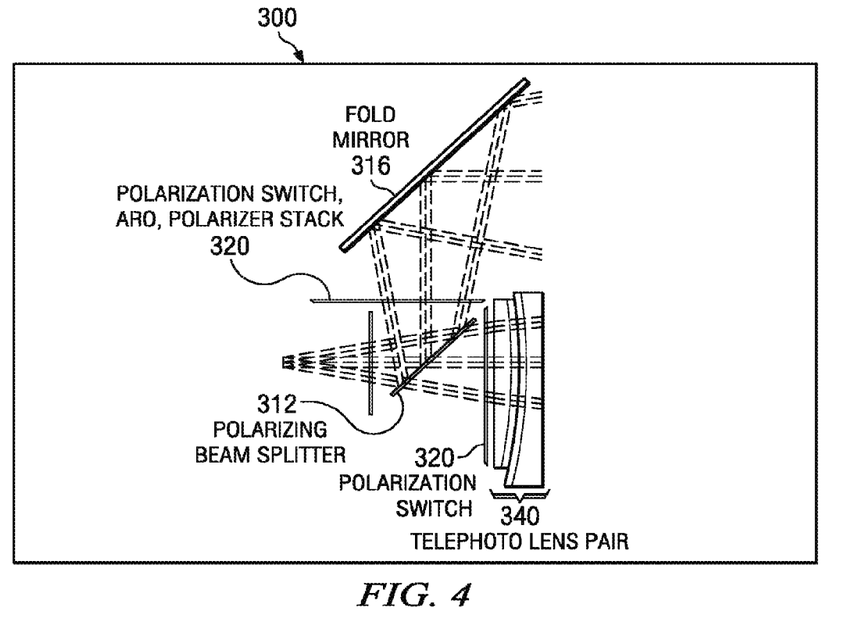
FIG. 4 is a schematic diagram of another embodiment of a PCS for cinematic projection, including a telephoto lens along an optical path and with the field of view centered on the optical axis, in accordance with the present disclosure.

In the polarization conversion system 100 of FIG. 2, the optical path of ray bundle A' is longer than that of ray bundle A (similarly B'-B and C'-C) resulting in a magnification difference between the images produced by A', B', C' and A, B, C. This magnification difference may be unacceptable to an audience, especially for wide angle and short-throw projection systems. Some techniques for correcting this magnification difference may include (1) providing a curved surface on the fold mirror 116 with optical power that compensates for the magnification difference; this solution is achromatic which is desirable; (2) adding a fresnel or diffractive surface with optical power to the fold mirror 116 to compensate for the magnification difference (which may or may not be achromatic); (3) adding a refractive element (lens) between the fold mirror 116 and polarization switch 120, or between the PBS 112 and fold mirror 116; a singlet lens is unlikely to be achromatic, but a doublet solution can be achromatic; (4) addition of a telephoto lens as illustrated in FIGS. 3 and 4; or (5) a combination of at least two of the above four techniques. In some embodiments, a telephoto lens may be implemented in the optical path where light transmits through the PBS. A telephoto lens allows control of magnification, distortion, and imaging properties with two elements such that the two images overlay within 1-2 pixels of each other, while maintaining spots sizes on the order of a fraction of a pixel and lateral color on the order of a pixel. Alternatively, a reverse telephoto lens may be implemented in the optical path where light reflects from the beamsplitter (between the polarization switch and fold mirror, or after the fold mirror).

Although as described, p-polarized light is transmitted toward the polarization switch 120, while s-polarized light is directed toward half-wave plate 114, it should be apparent to a person of ordinary skill in the art that an alternative configuration may be employed in which s-polarized light is transmitted toward the polarization switch 120, while p-polarized light is directed toward the half-wave plate 114.

FIG. 3 is a schematic diagram showing another embodiment of a PCS for cinematic projection 200. The elements of PCS 200 may be of similar type and function for those shown with respect to PCS 100 of FIG. 2. For instance, elements 2xx are similar to elements 1xx, where xx are the last two digits of the respective elements. In this embodiment, ray bundles A, B, and C may be directed through an additional set of fold mirrors 232, 234 operable to equalize the optical path lengths of bundles A and A', B and B', C and C' as shown in FIG. 3. [Note: bundles A' and C' are present, but not illustrated. They follow a similar path to the A', B', C' bundles shown in FIG. 2]. Note that although the PBS and fold mirrors are shown here to be orientated at 45 degrees to the optical axis, the PBS 212 and fold mirrors 216, 232, 236 may have other orientations in accordance with the present teachings. Additionally, glass may be inserted into the optical path of A', B', and C' (e.g., by replacing the fold mirror 216 with a right angle prism and/or using a glass cube PBS in place of a plate PBS) to reduce or eliminate the optical path difference between the A, B, C and A', B', C' bundles, respectively.

With reference to FIGS. 2 and 3, the image from bundles A', B', and C' should substantially overlap the image from bundles A, B, and C for viewing comfort (although perfect overlap is not necessarily required). Some techniques of adjusting one image location relative to the other include (1) using thumb screws or a similar mechanical techniques to tilt the fold mirror, PBS plate, or PBS cube; (2) mechanically de-centering a lens or element with optical power (e.g. curved mirror); (3) utilizing a feedback system to automatically adjust image position via one of the aforementioned image adjustment techniques; or (4) a combination of at least two of the above three techniques.

Optical transmission and stray light control may be optimized on optically transmissive elements by providing an anti-reflection coat thereon for high transmission and low reflection. Reflections from transmissive elements can cause stray light in the system which degrades contrast and/or produces disturbing artifacts in the final image. In some embodiments, additional absorptive polarizers may be placed after the half-wave plate 114 in the A', B', C' path and/or after the PBS 112 in either path to control polarization leakage and improve the final image contrast.

FIG. 4 is a schematic diagram showing another embodiment of a PCS for cinematic projection 300. The elements of PCS 300 may be of similar type and function for those shown with respect to PCS 100 of FIG. 2. For instance, elements 3xx are similar to elements 1xx, where xx are the last two digits of the respective elements.

In this exemplary embodiment, a telephoto lens pair 340 may be implemented in the optical path where light transmits through the PBS 312. Here, telephoto lens pair 340 is located along an optical path and with the field of view centered on the optical axis. Typically, telephoto lens 340 allows control of magnification, distortion, and imaging properties with two elements such that the two images overlay relatively close, i.e., within 1-4 pixels of each other, while maintaining spots sizes on the order of a fraction of a pixel and lateral color on the order of a pixel. Alternatively, a reverse telephoto lens (not shown) may be implemented in the optical path where light reflects from the PBS 312 (located between the polarization switch 320 and fold mirror 316, or after the fold mirror 316). If a telephoto or reverse telephoto lens is used for controlling magnification in one optical path, the radial distortion and keystone distortion of the final image can be tuned by laterally displacing the individual elements or pair of elements from the optical axis.

Figure 5:
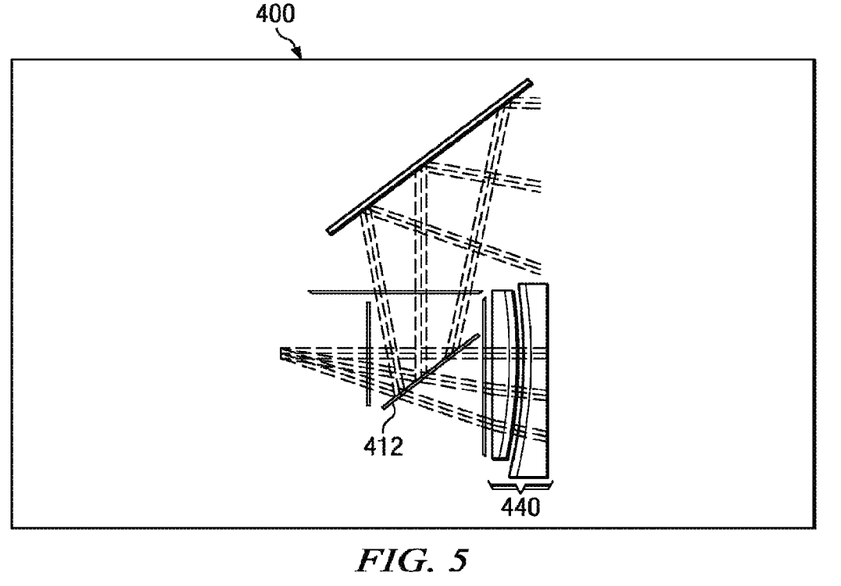
FIG. 5 is a schematic diagram of another embodiment of a PCS for cinematic projection, including a telephoto lens along an optical path and with the field of view not centered on the optical axis, in accordance with the present disclosure.

FIG. 5 is a schematic diagram showing another embodiment of a PCS for cinematic projection 400. The elements of PCS 400 may be of similar type and function for those shown with respect to PCS 100 of FIG. 2. For instance, elements 4xx are similar to elements 1xx, where xx are the last two digits of the respective elements. In this exemplary embodiment, a telephoto lens pair 440 may be implemented in the optical path where light transmits through the PBS 412. Here, telephoto lens pair 440 is located along an optical path and with the field of view decentralized from the optical axis. Just as described above, the radial distortion and keystone distortion of the final image can be tuned by laterally displacing the individual elements or pair of elements 440 from the optical axis.

Figure 6:
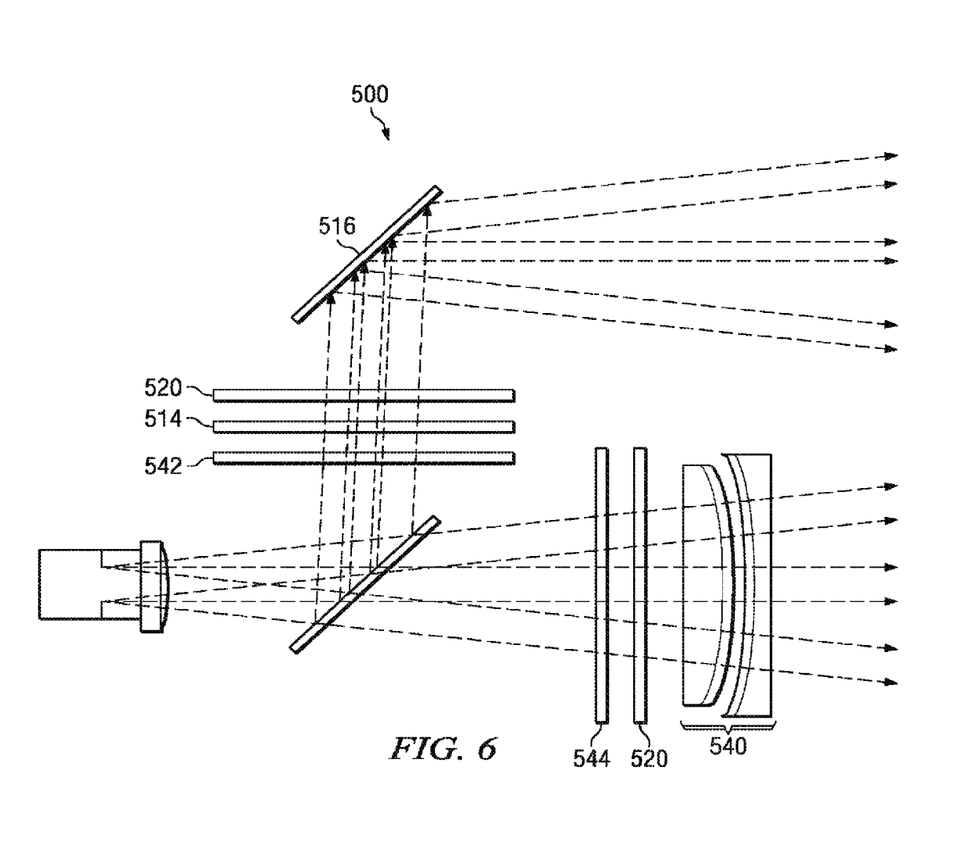
FIG. 6 is a schematic diagram of another embodiment of a PCS for cinematic projection to provide a circularly-polarized output, including a telephoto lens along an optical path and with field of view centered on an optical axis, in accordance with the present disclosure.

FIG. 6 is a schematic diagram of another embodiment of a PCS for cinematic projection 500 that provides a circularly polarized output. PCS 500 includes a telephoto lens pair 540 along an optical path, with field of view centered on an optical axis. In this case, each polarization switch 520 is a circular polarization switch (or Z-screen), e.g., as described in U.S. Pat. No. 4,792,850. The cleanup polarizers 542, 544 in each path are optional, depending on the level of contrast desired from the system. For example, including one or both cleanup polarizers may enhance the system contrast.

Figure 7:
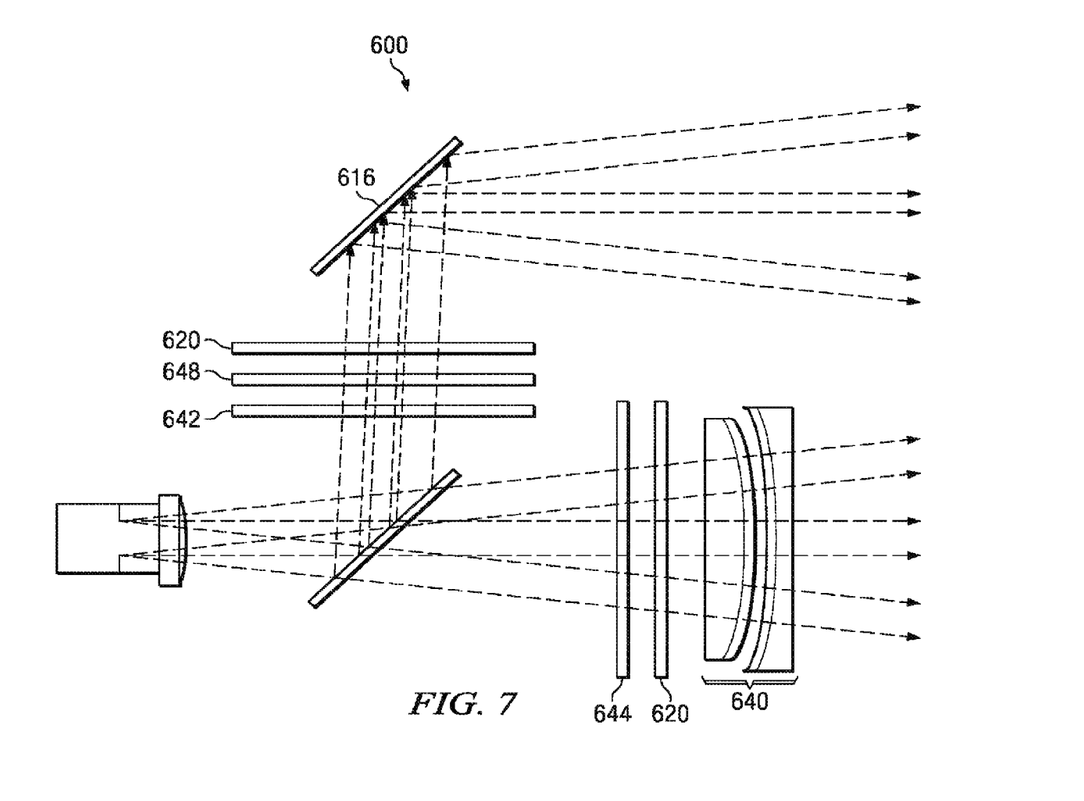
FIG. 7 is a schematic diagram of another embodiment of a PCS for cinematic projection to provide a linearly-polarized output, including a telephoto lens along an optical path and with field of view centered on an optical axis, in accordance with the present disclosure.

FIG. 7 is a schematic diagram of another embodiment of a PCS for cinematic projection 600 that provides a linearly polarized output. Here, each polarization switch 620 is an achromatic linear polarization switch, as described in U.S. patent application Ser. No. 11/424,087 entitled "Achromatic Polarization Switches", filed Jun. 14, 2006; also manufactured by ColorLink, Inc., of Boulder, Colo. Similar to the example in FIG. 6, cleanup polarizers 642, 644 in each path are optional, depending on the level of contrast desired from the system. For example, including one or both cleanup polarizers may enhance the system contrast. Additionally, the achromatic rotator 648 is optional, depending on the achromatic properties of the polarization switch 620.

Figure 8:
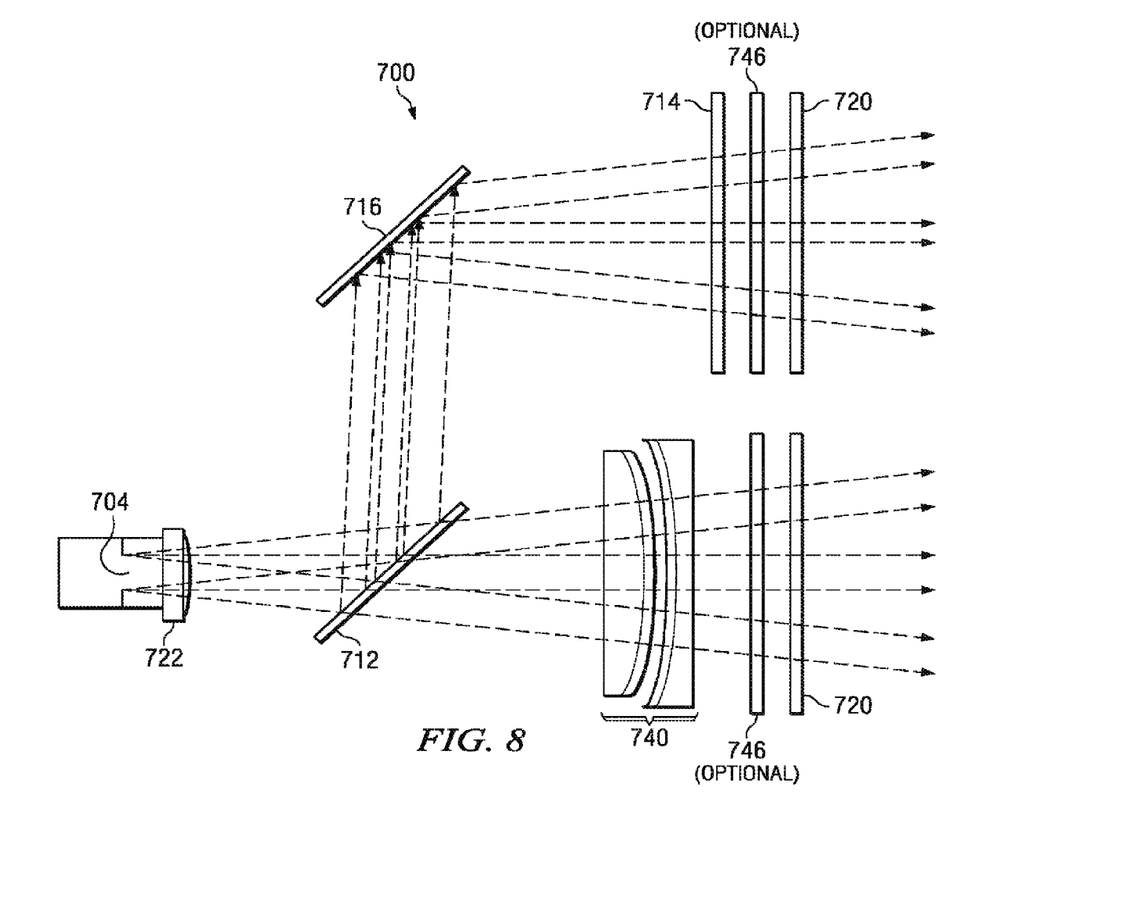
FIG. 8 is a schematic diagram of another embodiment of a PCS for cinematic projection in accordance with the present disclosure.

FIG. 8 is a schematic diagram of another embodiment of a PCS for cinematic projection 700, showing an alternative configuration in which the polarizers 746, achromatic rotator 714, and polarization switches 720 are located after other optical components. The elements of PCS 700 may be of similar type and function for those shown with respect to PCS 100 of FIG. 2. For instance, elements 7xx are similar to elements 1xx, where xx are the last two digits of the respective elements.

In operation, light exits projection lens 722 toward PBS 712. P-polarized light passes through PBS 712 toward telephoto lens pair 740, then toward polarization switch 720. An optional cleanup polarizer 746 may be located between telephoto lens pair 740 and polarization switch 720 to further enhance contrast. The s-polarized light reflected by PBS 712 is directed toward fold mirror 716, where it reflects toward an achromatic rotator 714 that transforms the s-polarized light into p-polarized light, then it passes through an optional cleanup polarizer 746. Next, the p-polarized light from achromatic rotator 714 passes through polarization switch 720. In this configuration, the s-polarized light reflected by the PBS 716 is efficiently reflected, with polarization maintained by the fold mirror 716. This relaxes any want for polarization preservation from the fold path and maximizes brightness. An achromatic 90° rotator 714 (probably retarder stack based) can be used to convert light from the fold mirror to the orthogonal state. In order to eliminate P-reflection from the PBS 712, a clean up polarizer 746 is likely desirable. This preferably follows the achromatic rotator 714, thereby reducing polarization conversion efficiency as a factor in system level contrast.

PCS 700 provides a high contrast image on the screen. In this exemplary embodiment, the final screen image has a center located on the optical axis of the projection lens. In some other embodiments, the final screen image may be located off-center from the optical axis—for example, a half screen height below the optical axis of the projection lens. In such embodiments, the polarizing beamsplitter 712 may be relocated to intercept the full illumination from the projection lens 722, and the fold mirror 716 may be tilted to properly overlay the two images on the screen. The polarization switch 720 in this embodiment has been split into two elements (one for each path) to increase fabrication yield; although, as previously discussed, it could alternatively be a single unit.

As used herein, the term "cinematic projection" refers to the projection of images using front and/or rear projection techniques, and includes, but is not limited to, applications for cinema, home theatre, simulators, instrumentation, head-up displays, and other projection environments where stereoscopic images are displayed.

While several embodiments and variations of polarization conversion systems for stereoscopic projection have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A polarization conversion system operable to direct stereo images onto an overlapping area of a cinema projection screen, the system comprising:
    a polarization beam splitter (PBS) operable to receive, from a projector lens, randomly-polarized diverging image light bearing the stereo images, to direct first diverging image light having a first state of polarization (SOP) along a first image light path, and to direct second diverging image light having a second SOP along a second image light path;
    a reflector located on the second image light path, wherein the reflector is operable to reflect the second diverging image light having the second SOP from PBS;
    a polarization rotator located on the second image light path, wherein the polarization rotator is operable to translate the second SOP to the first SOP; and
    a first polarization switch located on the first image light path, wherein the first polarization switch is operable to receive the first diverging image light from the first image light path, and to selectively translate the polarization state of the first diverging image light to one of a first output circular SOP and a second output circular SOP;
    a second polarization switch located on the second image light path, wherein the second polarization switch is operable to receive the second diverging image light from the second image light path, and to selectively translate the polarization state of the second diverging image light to one of the first output circular SOP and the second output circular SOP;
    wherein the reflector is operable to direct the second diverging image light on the second image light path to be selectively translated by the second polarization switch to substantially similar locations on the cinema projection screen as the first diverging image light on the first image light path selectively translated by the first polarization switch.

2. The polarization conversion system of claim 1, wherein the first polarization switch and the second polarization switch comprise a single panel that receives the diverging image light from the first image light path and the second image light path.

3. The polarization conversion system of claim 1, wherein the polarization conversion system is configured to maintain spots sizes on the cinema projection screen within a fraction of a pixel.

4. The polarization conversion system of claim 1, further comprising a cleanup polarizer located along the first image light path.

5. The polarization conversion system of claim 1, further comprising a cleanup polarizer located along the second image light path.

6. The polarization conversion system of claim 1, wherein an optical component of the system is configured to collimate diverged image light bundles passing therethrough in at least a portion of its path.

7. The polarization conversion system of claim 1, wherein an optical component of the system is configured to diverge collimated image light bundles passing therethrough in at least a portion of its path.

8. The polarization conversion system of claim 1, wherein image light passing between the PBS and the cinema projection screen comprises collimated image light in at least a portion of its path.

9. The polarization conversion system of claim 1, wherein image light passing through the system comprises collimated image light in at least a portion of its path.

* * * * *